(12) United States Patent
Itskov et al.

(10) Patent No.: US 7,654,893 B2
(45) Date of Patent: Feb. 2, 2010

(54) VIDEO GAME

(75) Inventors: Boris Itskov, Thornhill (CA); Peter A. Guterres, Toronto (CA)

(73) Assignee: JVL Corporation, Concord, ON (CA)

( * ) Notice: Subject to any disclaimer, the term of this patent is extended or adjusted under 35 U.S.C. 154(b) by 992 days.

(21) Appl. No.: 11/196,339

(22) Filed: Aug. 4, 2005

(65) Prior Publication Data
US 2007/0032280 A1    Feb. 8, 2007

(30) Foreign Application Priority Data
Jul. 11, 2005    (CA)   .................................  2511784

(51) Int. Cl.
*A63F 9/24*    (2006.01)
(52) U.S. Cl. .......................................... 463/3; 463/37
(58) Field of Classification Search ....................... None
See application file for complete search history.

(56) References Cited

U.S. PATENT DOCUMENTS

| 4,285,517 | A | * | 8/1981 | Morrison ........................ 463/9 |
| 4,359,220 | A | * | 11/1982 | Morrison et al. ................ 463/9 |
| 4,657,247 | A | * | 4/1987 | Okada .......................... 463/23 |
| 4,720,789 | A | * | 1/1988 | Hector et al. .................. 463/33 |
| 5,078,399 | A | * | 1/1992 | Lennon, Jr. ................... 463/47 |
| 5,685,776 | A | * | 11/1997 | Stambolic et al. .............. 463/46 |
| 5,769,716 | A | * | 6/1998 | Saffari et al. .................. 463/20 |
| 5,833,536 | A | * | 11/1998 | Davids et al. .................. 463/11 |
| 6,217,444 | B1 | * | 4/2001 | Kataoka et al. ................ 463/3 |
| 6,394,896 | B2 | * | 5/2002 | Sugimoto ....................... 463/3 |
| 6,500,065 | B1 | * | 12/2002 | Sato .............................. 463/4 |
| 6,835,132 | B2 | * | 12/2004 | Bennett ........................ 463/16 |
| 7,297,056 | B2 | * | 11/2007 | Takahashi et al. .............. 463/3 |

FOREIGN PATENT DOCUMENTS

| JP | 05-031256 | * | 2/1993 |
| JP | 2002-000939 | * | 1/2002 |

* cited by examiner

*Primary Examiner*—M. Sager (57) ABSTRACT

A simplified video game includes a series of timed events where each event is capable of a positive or negative result based on the timing of player input signal. A positive result requires a time period greater than a negative result. The following event automatically is initiated after completion of the preceding event until a certain cumulative time period is reached.

14 Claims, 7 Drawing Sheets

VIDEO GAME

FIELD OF THE INVENTION

The present application relates to video games and in particular relates to video games which are easily understood, requirement an element of skill and are competitive.

BACKGROUND OF THE INVENTION

Sophisticated video games that require specialized input devices to play, have proven very popular with children, adolescences and young adults. These games require a substantial degree of skill and have multiple levels with each level requiring additional expertise. Other computer video games are directed to an alternate world or game challenge where the player sets environmental conditions of the game and also selects or sets certain player characteristics or attributes. In some games the players work cooperatively for a common goal and in other games the players work against each other in a competitive environment.

Many of the more sophisticated games are played on home computers and are ongoing games played over a substantial period of time that need not be continuous.

Pay to play video arcade games are still available and range from the basic games to the more sophisticated games. In addition, there is a different market and consumer for countertop pay to play video games which are simplified games that are easy to play particularly using a touch screen as the input device. A host of different card games shooting games, etc. are available where the games typically have a relatively short time duration of from 1 to 3 minutes. These games are for entertainment purposes and are designed to be player friendly irrespective of the player's skill level. Such countertop games or console games are used in restaurants, bars, airports or other waiting areas and often function as a low cost time filler.

The players of these countertop video games are not typically game enthusiasts but may be somewhat older. The players enjoy a game having a competitive characteristic involving a degree of player skill but the game should also be easy to understand and execute. These games have very short learning curves and a player can then focus on the skill and the competitive aspect of the game to either play against himself for a personal best or against others in a competitive environment.

An important feature of a pay to play video game having such a short learning curve is the ability of the game to provide an experience to the player which is fulfilling in a relatively short period of time. Such an arrangement allows the entertainment device to be available to play more often or to execute a substantial number of games in a relatively short period of time. This is an important aspect as a pay to play game apparatus is often idle much of the time and usage may be very time dependent. There are often well known peak periods when it is important for the game apparatus to generate sufficient revenue to justify the cost of the device. It is also important that the price to play such games remain relatively low to encourage play and convince the customer they are receiving good value.

Many of these video game terminals have a host of different games available for play where the player may already have knowledge of a non computer version of the game such as a card game. Knowledge of pre-existing games available in other forms are also of assistance in overcoming a customers' potential reluctance or sensitivity to play a new game given that he may not be particularly successful. Furthermore, for many of these environments the consumer prefers a simplified video game for entertainment purposes during a relaxation or non-challenging escape period.

Some video game entertainment devices are avoided based on a potential consumers' fear that they will embarrass themselves due to a lack of knowledge of the details of the game or failure to understand or poorly implement the operation of the terminal. For this reason games which are relatively simple and easy to understand are often included in these video game entertainment devices, however the most popular games and revenue generating games have an element of competition and skill. Obviously these aspects have to be balanced with a game having a fast learning curve.

SUMMARY OF THE PRESENT INVENTION

A simplified video game for play on a pay to play computing device having a touch screen display and input device according to the present invention includes a series of timed events displayed on the touch screen. Each event produces a positive result or a negative result determined by the timing of a player's input signal relative to the event being displayed. The game for a positive result produces a series of screens depicting the actual positive result and displays a quantified measurement of the positive result. The game for a negative result produces a series of screens depicting the negative result. The event for a positive result requires a time duration greater than the time duration of a negative result. The game further includes the automatic initiation of the next event of the series of timed events after completion of one of said events until a total time period for the series of events has expired.

According to an aspect of the invention the series of events includes a first series of events and a bonus series of events. The first series of events is associated with a first round of the game and the first round has a fixed time period. The game includes a bonus round including the bonus series of events and having a fixed time period. The game provides a bonus round following a successful first round where a predetermined value has been exceeded. The predetermined value is compared to a cumulative total of at least some of the quantified measurements of events of the first round.

In a further aspect of the invention at least some of the quantified measurement of events of the first round includes at least the best 3 events of the first round.

In yet a further aspect of the invention at least some of the quantified measurement of events of the first round includes at least the best 5 events of the first round.

In a different aspect of the invention the ratio of total time for a positive result to the total time for a negative result is at least 3:2.

In a different aspect of the invention the ratio of total time for a positive result to the total time for a negative result is at least 2:1.

In a preferred aspect of the invention the time duration for a first round is less than 4 minutes.

In different aspect of the invention the time duration of a bonus round is less than 2 minutes.

In an aspect of the invention each event is associated with a falling object being displayed on the touch screen and a displayed character for attempting to strike the falling object to displace the falling object based the player's input controlling the timing of the strike of the falling object.

BRIEF DESCRIPTION OF THE DRAWINGS

The above as well as other advantages and features of the present invention will be described in greater detail according to the preferred embodiments of the present invention in which.

DETAILED DESCRIPTION OF THE PREFERRED EMBODIMENTS

Figure 1:
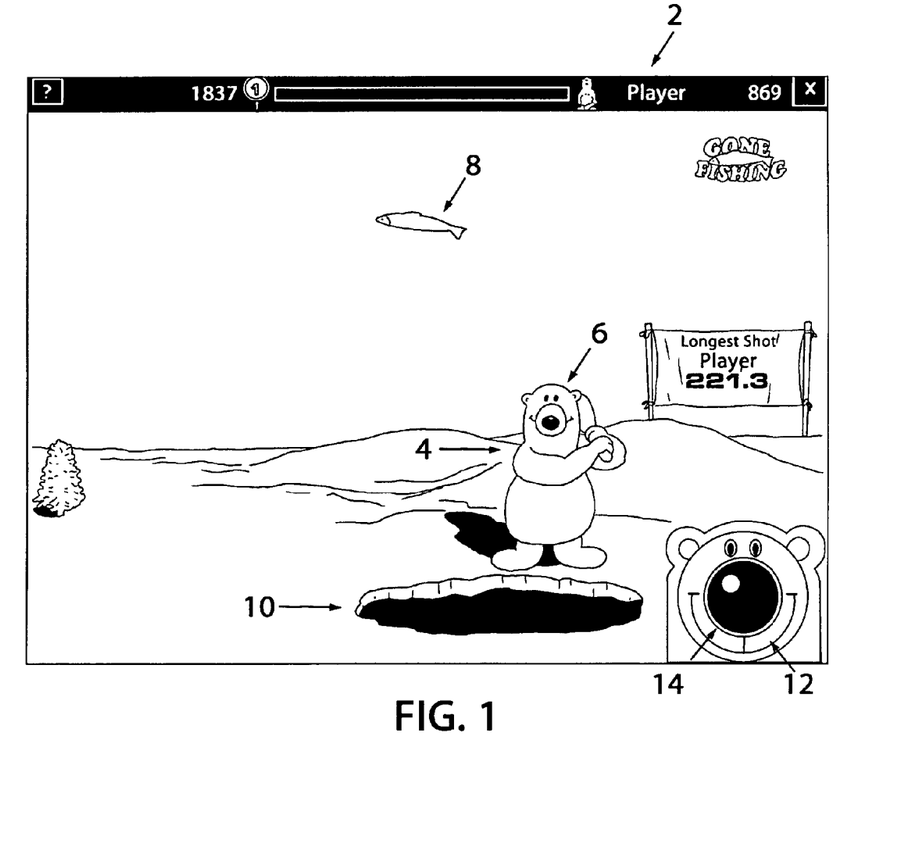
FIG. 1 is a screen shot from the game Gone Fishing during a play event.

The screen of FIG. 1 is essentially the screen that will be shown on the touch screen video game device. The touch screen 2 includes a batter 4, shown as a polar bear, with a baseball bat 6 for striking the jumping fish 8. The jumping fish 8 jumps out of the hole in the ice 10. The fish 8 achieves a substantial height above the hole 10 as indicated in the depiction of the touch screen 2 of FIG. 1 before falling by gravity towards the hole 10. The jumping of the fish out of the hole 10 provides a warning to the player to be ready for striking of the fish on its subsequent downward travel.

The player playing the game is presented with a series of screens with the polar bear generally as indicated in FIG. 1 with a fish at various positions as it jumps from the hole in the ice 10 and falls toward the hole 10. The player has an input area indicated as 12 in the form of a depiction of the head of the polar bear 4. Touching of the nose portion 14 causes the polar bear 4 to swing the bat 6. In the preferred embodiment 1 illustrated the input area corresponding to the nose position is quite specific. It is possible to merely allow player input by touching the touch screen anywhere.

Figure 2:
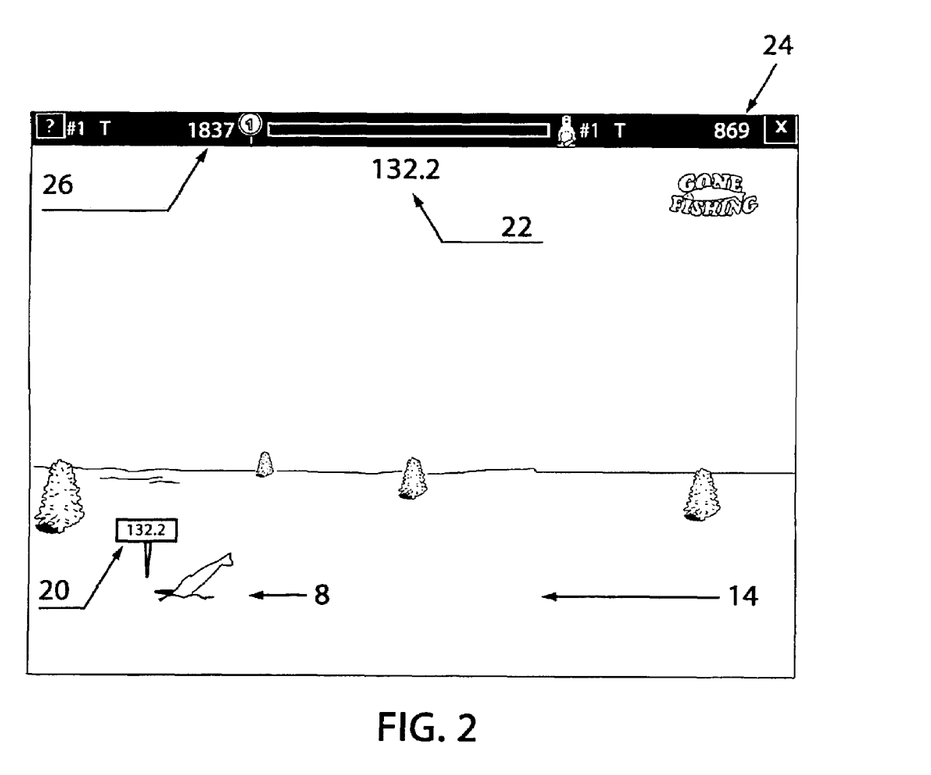
FIG. 2 is a screen shot showing a particular result for one play event.

Basically the swinging of the bat 6 is a timed event and is compared with the position of the jumping fish 8 to determine whether an impact will occur (a series of screens). Thus the player's input is solely the time of his touching input signal. There is no variation based on the position of the touch input. If an impact does occur the results of the impact are shown on the touch screen. The timing of the impact and the position of the fish as it falls toward the hole 10, determines a certain trajectory of the jumping fish 8 and the eventual final location of the jumping fish, a distance from the hole in the ice 10. Two results are shown in the touch screens of FIGS. 2 and 3. In FIG. 2 the particular timing of the swing of the bat 6 has resulted in the jumping fish 8 taking on a relatively high trajectory from the bat. The fish when it impacts the snow packed surface shown as 14 is partially buried in the surface. There is no bounce or roll associated with this particular event and the distance of 132.3 meters is shown on the result sign 20 adjacent the buried fish 8. The final distance is also shown in the center of the screen at the top indicated as 22.

Figure 3:
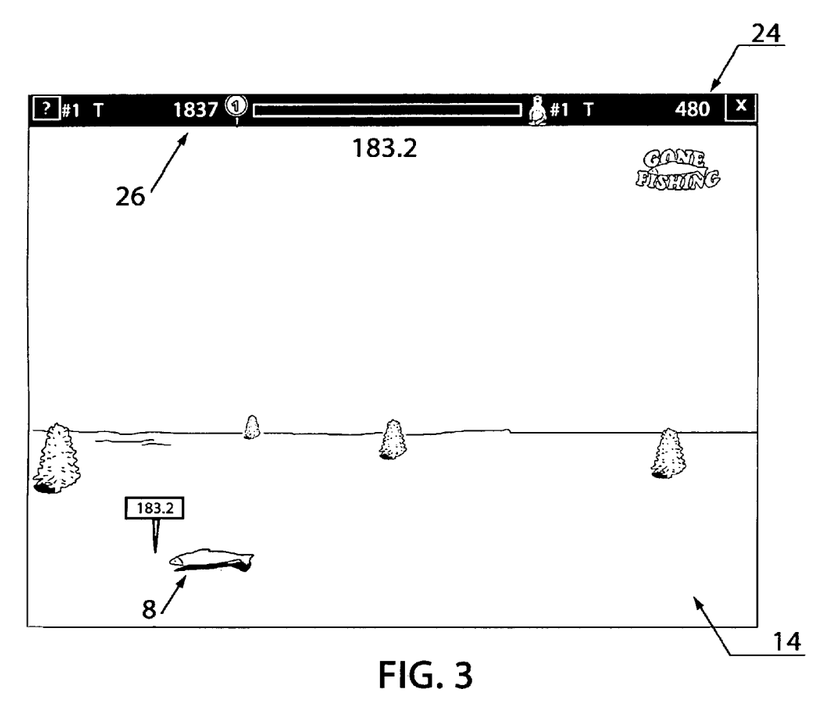
FIG. 3 is a screen shot showing a result of a different play event.

A slightly different result from a different event of the game is shown in FIG. 3. In this case the fish 8 has achieved a distance of 183.2 meters from the hole in the ice 10. The fish 8 is shown merely supported on the snow surface 14 and this particular fish due to the trajectory of the fish was initially bounced off the surface 14 and achieved a further distance. Depending upon the particular trajectory one or more bounces may occur and are shown to the player on the screen. The greatest distance from the hole 10 is achieved by a particular impact with the jumping fish determined by the timing of the player activating the swing of the bat relative to the position of the jumping fish as it is falling towards the hole 10. Basically, this is merely a time relationship and certain results are predetermined and provided in a table. These results are then shown illustrating a particular trajectory of the fish the impact of the fish with the snow surface 14 and any bounce associated with that impact. The fish then comes to rest and a result is posted based on the calculated distance from the hole. Thus the jumping of the fish and the swinging of the bat and the result of the swinging of the bat represent a particular game event. If the timing of the input signal produces a miss the fish returns to the hole in the ice (i.e., a negative outcome) and a new game event is automatically commenced. If the timing associated with the swinging of the bat results in impact with the fish, then various screens are shown depicting the particular result. The results are then posted and after the results have been posted the next game event automatically occurs without further player input.

In this way the player is automatically brought to the next game event which commences with a fish jumping out of the hole 10. If a successful hit occurs exclusively dictated by the timing of the players input signal certain screens are shown and the distance result is posted. The time required to show and post a positive outcome is somewhat longer than the time to show and post a negative outcome where impact with the fish does not occur. Certain screens are shown illustrating the non-impact with the fish followed by the next game event automatically commencing. The time required to confirm and show the negative impact is shorter than a successful result.

With this automatic commencing of the next game event, a non-skilled player and a skilled player are subject to a different number of events as the game has a certain time duration. A non-successful hit does result in some time elapsing from the total game time, however the next event occurs more quickly and provides the less skilled player with an additional opportunity to achieve a better result. Furthermore, a skilled player may indeed have produced a hit of the fish but this hit may not produced in a desirable result. For example, the screen of FIG. 2 with the result of 132.3 meters is a poor result given that under the particular game characteristics shown, a bonus round is provided if the player's best five events result in a cumulative distance greater than 1000 meters. This cumulative result of the best five events is shown at area 24 at the top of the screen. Area 26 shows the present all time best for the particular machine. Thus an undesirable positive result requires more time than a negative event and acts to provide further balance between skilled and non-skilled players.

Figure 4:
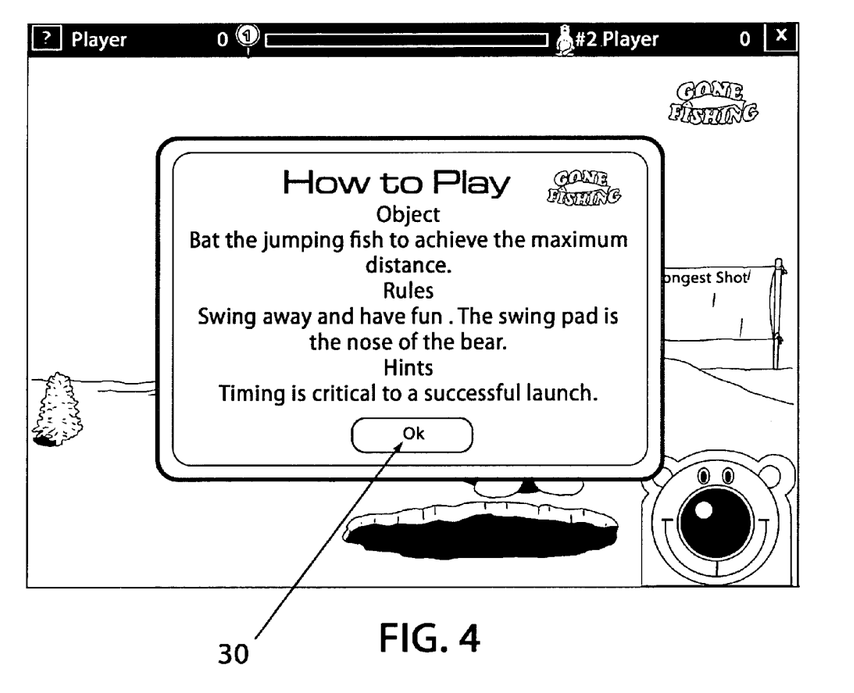
FIG. 4 is a screen shot providing instructions for the game.

FIG. 4 shows the particular initial screen providing instructions with respect to game play. Given that the play is relatively simple and easily understood this screen is quickly bypassed by hitting the OK button indicated as 30.

Figure 5:
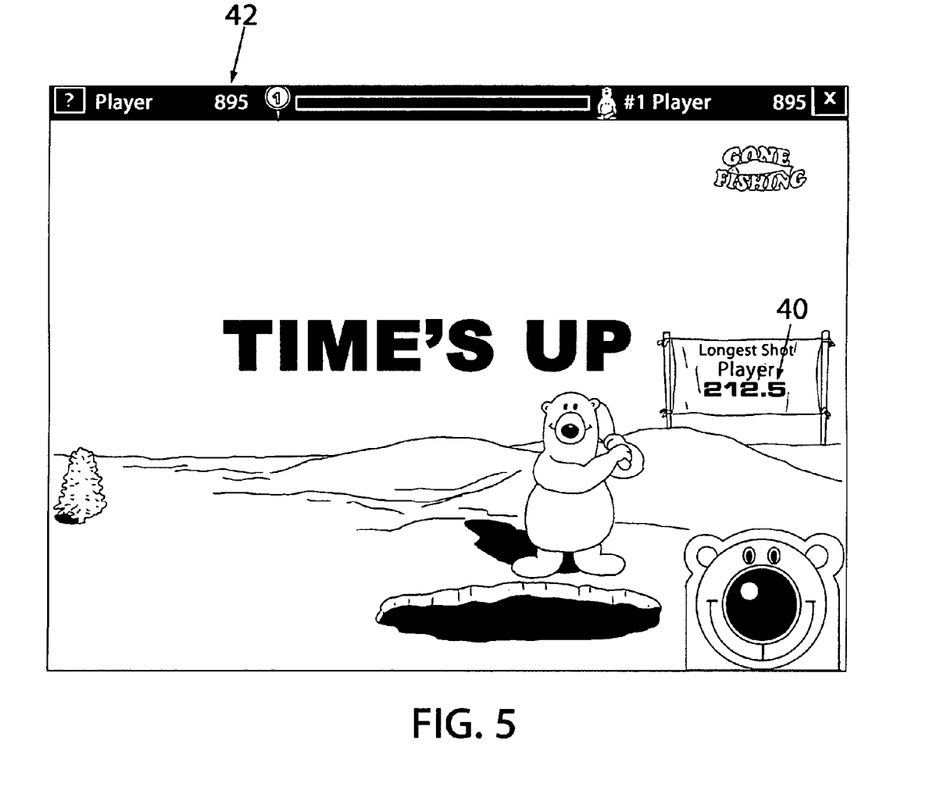
FIG. 5 is a screen shot where the time for the particular game has expired and a cumulative score for various play events and the best result of an individual event of the game is posted.

FIG. 5 shows the result of a particular game of player number 1 where the total time for the game has expired. In this case the screen of FIG. 5 is displayed indicating that the time has expired. In addition, the player's best result is shown in area 40 and in this case the player achieved a distance of 212.5 meters. The player's total distance for his best five events are shown at the top of the screen and indicated as 895 meters at position 42. This screen will be maintained for a short period of time and then the game will return to an attract mode or allow the player to play the game again or play a different game if credits are available on the machine.

Figure 6:
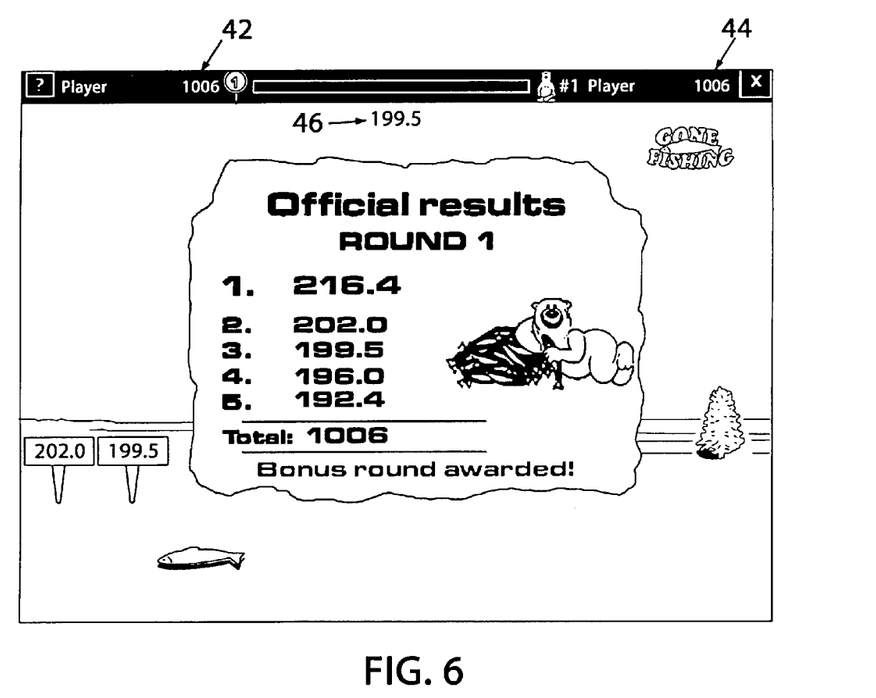
FIG. 6 is a further screen shot providing the posting of the result for the particular game and a awarding a bonus round based on the results achieved.
Figure 7:
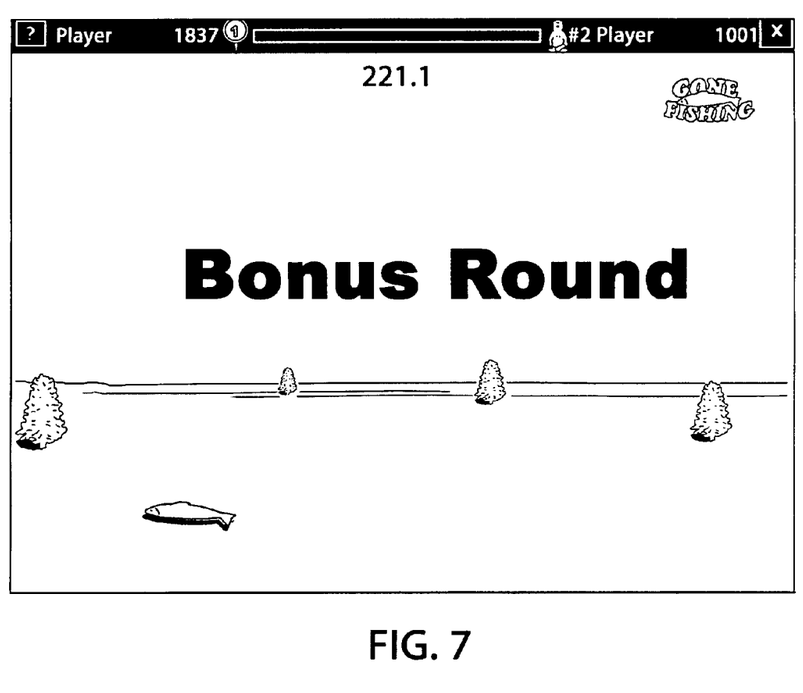
FIG. 7 is an acknowledgement screen that the bonus round is about to start.

FIG. 6 shows a slightly different result for the game. In this case the time for the game has expired however the player number 1 has achieved a total distance of 1006 meters indicated at 42 and 44 of FIG. 6 and his last result is indicated at a distance of 199.5 meters at area 46. A bonus round is awarded if the player based on his best five events achieves a distance in excess of a certain number. In this case the bonus round is awarded at a distance of 1000 meters or more. The player has achieved five events that cumulatively exceed this amount and therefore the game displays the official results and awards a bonus round. As can be seen, two of the player's events are in excess of 200 meters and three are short of the 200 meters distance. This results in a total of 1006 meters and therefore the bonus round is awarded. The individual best results are shown on the screen of FIG. 6 as well. In this way, recognition of a good opening round is achieved and a total for his best five events is displayed for his own personal record and a prize is awarded allowing the player to participate the bonus round indicated in FIG. 7.

The game is preferably set up such that it is not possible to achieve a bonus round from a bonus round. Basically, when the time for the bonus round expires the game ends. The game will post the results of the bonus round to provide feedback and recognition to the player.

This particular video game is simple to play in that the player merely touches the activation area 14 to solely determine the timing of a bat swing. The game then determines whether an impact occurs and displays the results. If a successful result occurs, i.e., impact with the jumping fish, the results of this impact are shown and a distance displayed. In the event that the timing of the swing does not result in a successful impact, this non-successful event is also displayed, i.e., the fish is shown returning to the hole however the next game event is automatically commenced within a shorter time period. In the event of a successful strike the results are displayed and once again after the results have been displayed the game automatically commences the next game event.

In this way, the game is played and continues and the player merely provides input regarding timing of the swinging of the bat. There is no input to initiate the next event as the game automatically determines this and executes the necessary steps. The play of the game is fast and the time of the game allows and effectively guarantees a relatively substantial number of events to occur. For example, given that this game is designed where the bonus round is determined on a players' best five events, the timing of the game can be set such that even if the player's timing of the swing of the bat results in all successful impacts with the fish the number of events for the game will be in excess of 10 for example. Thus the player has a significant number of events to attempt to provide five good results for achieving the bonus round.

In the event that a player is not as skilled, some of the events will be a failure to impact the fish and the game is designed to commence the next event more quickly and thus the player over the length of the game will have attempted more game events to the number of attempted where all events or most of the events were positive.

Although the game is extremely straightforward to understand, the degree of control or perceived control, i.e., player skill in achieving a good result, is relatively high. The automatic triggering of the next event assures a relatively quick pace and allows the player to concentrate on the timing of the bat swing.

It has been found that this game having a certain time duration, a certain time period for a particular game event, and the automatic initiation of the next game event based on the outcome of the previous particular event, is competitive and satisfying. Players of different experience can compete favorably with each other and also the players can compete against their own personal best. Furthermore, the game does not provide a technology challenge for the individual players. In particular, all players can quickly understand the game and play the game effectively without any substantial experience. Limiting the player's input to the timing of an input signal with the outcome then being predetermined has proven to be well accepted.

The game allows the player with a single input signal, to produce a great result. For example, the last swing of the bat prior to time running out could produce a personal or all time best result. Thus the game continues to hold the player's attention as there is always a chance to produce a rewarding outcome. A bonus round can also be awarded on the basis of a single event equaling or exceeding a certain level.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A simplified video game for play on a pay to play computing device having a touch screen display and input device, said game including a series of timed game events displayed on said touch screen where each game event is capable of a positive result or a negative result based on the timing of a player's input signal relative to the game event being displayed; said game for a positive result producing a series of screens depicting the positive result and displaying a quantified measurement of the positive result; said game for a negative result producing a series of screens depicting the negative results; said game automatically initiating the next game event of the series after completion of a game event until a total time period for the series of game events has expired wherein each event is associated with an object generally moving in a vertical direction being displayed on said touch screen and a displayed character for attempting to strike the falling object to displace the falling object based on the player's input controlling the timing of the strike of the falling object.

2. A simplified video game as claimed in claim 1 wherein said game event for a positive result requiring a particular amount of time greater than the time required for a game event for a negative result.

3. A simplified video game as claimed in claim 1 wherein said series of events includes a first series of events and a bonus series of events, said first series of events is associated with a first round of said game and said first round has a fixed time period, said game including a bonus round including said bonus series of events and having a fixed time period; said game providing a bonus round following a successful first round where a predetermined value has been exceeded, said predetermined value being compared to a cumulative total of at least some of the quantified measurements of events of said first round.

4. A simplified video game as claimed in claim 3 wherein said at least some of the quantified measurement of events of said first round includes at least the best 3 events of the first round.

5. A simplified video game as claimed in claim 3 wherein said at least some of the quantified measurement of events of said first round includes at least the best 5 events of the first round.

6. A simplified video game as claimed in claim 3 wherein the ratio of total time for a positive result to the total time for a negative result is at least 3:2.

7. A simplified video game as claimed in claim 2 wherein the ratio of total time for a positive result to the total time for a negative result is at least 3:2.

8. A simplified video game as claimed in claim 2 wherein the ratio of total time for a positive result to the total time for a negative result is at least 2:1.

9. A simplified video game as claimed in claim 6 wherein said time duration for a first round is less than 4 minutes.

10. A simplified video game as claimed in claim 9 wherein the time duration of a bonus round is less than 2 minutes.

11. A simplified video game as claimed in claim 1 wherein each event is associated with a falling object being displayed on said touch screen and a.

12. A simplified video game as claimed in claim 3 wherein each event is associated with a falling object being displayed on said touch screen and a.

13. A simplified video game as claimed in claim 12 wherein said character strikes the falling object using an implement.

14. A simplified video game as claimed in claim 1 wherein said game event for a positive result and said game event for a negative result, each producing a series of screens displayed on said touch screen and the time required for displaying the series of screens of a positive result is similar to the time required for displaying the series of screens of a negative result.

\* \* \* \* \*